United States Patent
Kim et al.

(10) Patent No.: US 9,369,193 B2
(45) Date of Patent: Jun. 14, 2016

(54) EFFICIENT FEEDBACK TRANSMISSION METHOD IN MULTI-ANTENNA WIRELESS COMMUNICATION SYSTEM AND DEVICE FOR SAME

(71) Applicant: LG ELECTRONICS INC., Seoul (KR)

(72) Inventors: Youngtae Kim, Anyang-si (KR); Jonghyun Park, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/424,880

(22) PCT Filed: Sep. 3, 2013

(86) PCT No.: PCT/KR2013/007928
§ 371 (c)(1),
(2) Date: Feb. 27, 2015

(87) PCT Pub. No.: WO2014/038832
PCT Pub. Date: Mar. 13, 2014

(65) Prior Publication Data
US 2015/0236773 A1 Aug. 20, 2015

Related U.S. Application Data

(60) Provisional application No. 61/697,278, filed on Sep. 5, 2012.

(51) Int. Cl.
*H04B 7/06* (2006.01)
*H04B 7/04* (2006.01)
(Continued)

(52) U.S. Cl.
CPC ............ *H04B 7/0626* (2013.01); *H04B 7/0456* (2013.01); *H04B 7/0617* (2013.01); *H04B 7/0639* (2013.01); *H04W 24/10* (2013.01); *H04W 72/042* (2013.01)

(58) Field of Classification Search
CPC ........................... H04B 7/0469; H04B 7/0639
See application file for complete search history.

(56) References Cited

U.S. PATENT DOCUMENTS

2006/0239374 A1* 10/2006 Aldana ................ H04B 7/0634
375/267
2011/0205930 A1 8/2011 Rahman et al.
(Continued)

FOREIGN PATENT DOCUMENTS

WO WO 2011/162422 A2 10/2011
WO WO 2011/162422 A1 12/2011
(Continued)

*Primary Examiner* — Ross Varndell
(74) *Attorney, Agent, or Firm* — Birch, Stewart, Kolasch & Birch, LLP

(57) ABSTRACT

The present invention relates to a method for feeding back channel state information with respect to downlink transmission of a terminal in a wireless communication system supporting multiple antennas. Particularly, the method comprises the steps of measuring a channel with respect to downlink transmission; and transmitting a precoding matrix indicator (PMI) to which a precoding matrix for multiple antennas is applied, on the basis of the channel measuring result, wherein the multiple antennas are defined as a group of N antenna (N>0, N is an integer), and the precoding matrix for multiple antennas is determined by a precoding matrix for the group of N antennas and a phase coefficient matrix with respect to the precoding matrix for the group of N antennas.

7 Claims, 6 Drawing Sheets

(51) Int. Cl.
*H04W 24/10* (2009.01)
*H04W 72/04* (2009.01)

(56) References Cited

U.S. PATENT DOCUMENTS

2012/0039251 A1 2/2012 Sayana et al.
2013/0077660 A1 3/2013 Ko et al.
2013/0279619 A1 10/2013 Chen et al.

FOREIGN PATENT DOCUMENTS

WO WO 2011162422 A1 * 12/2011 ........... H04B 7/0417
WO WO 2012/093332 A1 7/2012

* cited by examiner (a)

(b)

(a)

(b)

(a)

(b)

(c)

EFFICIENT FEEDBACK TRANSMISSION METHOD IN MULTI-ANTENNA WIRELESS COMMUNICATION SYSTEM AND DEVICE FOR SAME

CROSS REFERENCE TO RELATED APPLICATIONS

This application is the National Phase of PCT International Application No. PCT/KR2013/007928, filed on Sep. 3, 2013, which claims priority under 35 U.S.C. 119(e) to U.S. Provisional Application No. 61/697,278 filed on Sep. 5, 2012, all of which are hereby expressly incorporated by reference into the present application.

TECHNICAL FIELD

The present invention relates to a wireless communication system, and more particularly, to an efficient feedback transmission method in multi-antenna wireless communication system and a device for the same.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting end or a receiving end of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP LTE (3$^{rd}$ Generation Partnership Project Long Term Evolution) supports a maximum of 4 Tx antennas for downlink transmission and defines a precoding codebook for downlink transmission using the Tx antennas.

In a MIMO based cellular communication environment, data transfer rate can be improved through beamforming between a transmitting end and a receiving end. Whether beamforming is applied is determined based on channel information, a channel estimated through a reference signal at the receiving end is appropriately quantized using a codebook and fed back to the transmitting end.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$

Here, H(i,k) represents a spatial channel matrix, $N_r$ denotes the number of Rx antennas, $N_t$ denotes the number of Tx antennas, r is an Rx antenna index, t is a Tx antenna index, i represents an OFDM (or SC-FDMA) symbol index and k represents a subcarrier index.

$h_{r,t}(i,k)$ is an element of the channel matrix H(i,k) and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R. $R=E[H_{i,k}^{H} H_{i,k}]$ where H denotes a spatial channel matrix and R denotes a spatial channel covariance matrix. In addition, E[ ] represents the mean, i represents a symbol index and k represents a frequency index.

Singular value decomposition (SVD) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an Eigen value as a basis using spectrum theory. When it is assumed that the channel matrix H is an m×n matrix composed of a plurality of set elements, the matrix H can be represented as a product of three matrices as follows.

$$H_{m \times n} = U_{m \times n} \Sigma_{m \times n} V_{n \times n}^{H}$$

Here, U and V represent unitary matrices and $\Sigma$ denotes an m×n matrix including a non-zero singular value. The singular value is $\Sigma = \text{diag}(\sigma_1 \ldots \sigma_r), \sigma_i = \sqrt{\lambda_i}$. Representation as a product of three matrices is referred to as SVD. SVD can handle normal matrices, compared to Eigen value decomposition which can decompose only orthogonal square matrices. SVD and Eigen value composition are related to each other.

When the matrix H is a positive definite Hermitian matrix, all Eigen values of H are non-negative real numbers. Here, singular values and singular vectors of H are equal to Eigen values and Eigen vectors of H. Eigen value decomposition (EVD) can be represented as follows (here, Eigen values may be $\lambda_1, \ldots, \lambda_r$).

$$HH^{H} = (U \Sigma V^{H})(U \Sigma V^{H})^{H} = U \Sigma \Sigma^{r} U^{H}$$

$$H^{H} H = (U \Sigma V^{H})^{H} (U \Sigma V^{H}) = V \Sigma^{r} \Sigma V$$

Here, Eigen values can be $\lambda_1, \ldots, \lambda_r$. Information on U between U and V, which indicate channel directions, can be known through singular value decomposition of $HH^{H}$ and information on V can be known through singular value decomposition of $H^{H}H$ In general, a transmitting end and a receiving end respectively perform beamforming in order to achieve higher throughput in multi-user MIMO (MU-MIMO). When a receiving end beam and a transmitting end beam are represented by matrices T and W, a channel to which beamforming is applied is indicated by $THW=TU(\Sigma)VW$. Accordingly, it is desirable to generate the receiving end beam on the basis of U and to generate the transmitting end beam on the basis of V in order to accomplish higher throughput.

In design of a codebook, it is necessary to reduce feedback overhead using as few bits as possible and to correctly quantize a channel to obtain a sufficient beamforming gain. One of codebook design schemes presented or adopted as a standard by recent mobile communication systems, such as 3GPP LTE (3rd Generation Partnership Project Long Term Evolution), LTE-Advanced and IEEE 16m, is to transform a codebook using a long-term covariance matrix of a channel, as represented by Equation 1.

$$W' = \text{norm}(RW) \qquad \text{[Equation 1]}$$

Here, W denotes an existing codebook generated to reflect short-term channel information, R denotes a long-term covariance matrix of channel matrix H, norm(A) represents a matrix in which norm is normalized into 1 per column of matrix A, and W' represents a final codebook generated by transforming the codebook W using the channel matrix H, the long-term covariance matrix R of the channel matrix H and a norm function.

The long-term covariance matrix R of the channel matrix H can be represented as Equation 2.

$$R = E[H^H H] = V \Lambda V^H = \sum_{i=1}^{Nt} \sigma_i v_i v_i^H \quad \text{[Equation 2]}$$

Here, the long-term covariance matrix R of the channel matrix H is decomposed into $V \Lambda V^H$ according to singular value decomposition. V is an Nt×Nt unitary matrix having $V_i$ as an i-th column vector, $\Lambda$ is a diagonal matrix having $\sigma_i$ as an i-th diagonal component and $V^H$ is a Hermitian matrix of V. In addition, $v_i$ and $v_i$ respectively denote an i-th singular value and an i-th singular column vector corresponding thereto ($\sigma_1 \geq \sigma_2 \geq \ldots \geq \sigma_{Nt}$).

DISCLOSURE

Technical Problem

An object of the present invention is to provide a feedback transmission method based on a codebook in a wireless communication system and a device for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problem, according to one aspect of the present invention, a method for feeding back channel state information with respect to downlink transmission of a user equipment in a wireless communication system supporting multiple antennas comprises the steps of performing channel measurement for the downlink transmission; and transmitting a precoding matrix indicator (PMI) to which precoding matrixes for multiple antennas are applied, on the basis of the result of the channel measurement, wherein the multiple antennas are defined by N number of antenna groups (N>0, N is an integer), and the precoding matrixes for multiple antennas are determined by precoding matrixes for the N number of antenna groups and phase coefficient matrixes corresponding to the precoding matrixes for the N number of antenna groups.

Moreover, the precoding matrixes for the antenna groups are determined by a precoding matrix based on the number of antennas and a diagonal matrix based on the number of layers.

Moreover, each of the precoding matrixes for the N number of antenna groups has a precoding pattern determined on the basis of a channel correlation between the N number of antenna groups.

Moreover, each of the phase coefficient matrixes has a phase coefficient determined using channel state information (CSI), and a phase coefficient corresponding to a specific index is set to 0.

Moreover, the method further comprises the step of identifying grouping information for determining antenna groups for the multiple antennas.

Moreover, each of the N number of antenna groups has the number of antennas set independently.

Moreover, each of the precoding matrixes for the N number of antenna groups has the number of layers set independently.

Moreover, each of the phase coefficient matrixes has phase factors for the N number of precoding matrixes, which are set independently.

Moreover, the method further comprises the step of receiving indication information for selecting M number of antennas selected from the N number of antenna groups (N≥M>0, N and M are integers).

To solve the aforementioned technical problem, according to another aspect of the present invention, a user equipment for feeding back channel state information with respect to downlink transmission in a wireless communication system supporting multiple antennas comprises a radio frequency (RF) unit; and a processor, wherein the processor is configured to perform channel measurement for the downlink transmission and transmitting a precoding matrix indicator (PMI) to which precoding matrixes for multiple antennas are applied, on the basis of the result of the channel measurement, the multiple antennas are defined by N number of antenna groups (N>0, N is an integer), and the precoding matrixes for multiple antennas are determined by precoding matrixes for the N number of antenna groups and phase coefficient matrixes corresponding to the precoding matrixes for the N number of antenna groups.

Advantageous Effects

According to the embodiment of the present invention, a feedback transmission method based on a codebook to efficiently support MIMO transmission in a wireless communication system and a device for the same may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE mobile communication systems are used. However, the description is applicable to any other mobile communication system except for specific features inherent to the 3GPP LTE systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term "base station (BS)" is assumed to refer to any node of a network end, such as a Node B, eNode B, an access point (AP), etc., communicating with a UE. While the following description is based on 3GPP LTE and LTE-A, the present invention is applicable to other communication systems.

In a mobile communication system, a UE may receive information from a BS on downlink and transmit information to the BS on uplink. The information that the UE transmits or receives includes data and various types of control information. There are many physical channels according to the types and usages of information that the UE transmits or receives.

A description will be given of 3GPP LTE (3$^{rd}$ Generation Partnership Project Long Term Evolution) (referred to as LTE hereinafter) and LTE-Advanced (referred to as LTE-A hereinafter) systems as exemplary mobile communication systems to which the present invention is applicable.

Figure 1:
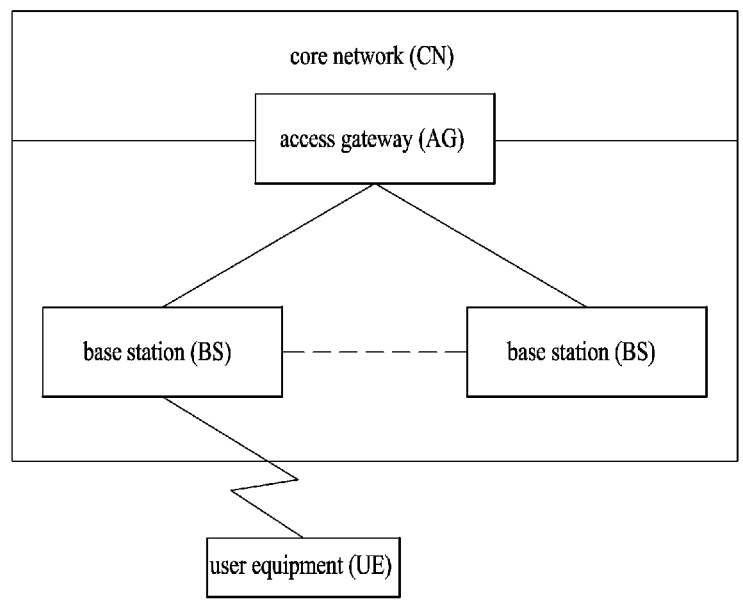
FIG. 1 illustrates E-UMTS (Evolved Universal Mobile Telecommunication System) network architecture as an exemplary mobile communication system.

FIG. 1 illustrates E-UMTS (Evolved Universal Mobile Telecommunication System) network architecture as an exemplary mobile communication system.

E-UMTS, which evolves from UMTS (Universal Mobile Telecommunication System), is under standardization according to 3GPP. E-UMTS may be regarded as an LTE system. Technical specification of UMTS and E-UMTS refers to Release 7 and Release 8 of "3$^{rd}$ Generation Partnership Project: Technical Specification Group Radio Access Network".

Referring to FIG. 1, E-UMTS includes a user equipment (UE), en eNB and an access gateway (AG) located at the end of a network (E-UTRAN) and connected to an external network. The eNB can simultaneously transmit multiple data streams for broadcast service, multicast service and/or unicast service.

One or more cells are present in one eNB. A cell is set to one of bandwidths of 1.25, 2.5, 5, 10, 15 and 20 MHz and provides downlink or uplink transmission service to multiple UEs. Different cells may be configured to provide different bandwidths. The eNB controls data transmission/reception with respect to a plurality of UEs. The eNB transmits downlink scheduling information about downlink data to a corresponding UE to inform the UE of a time/frequency region used to transmit the data, coding information, data size, hybrid automatic repeat and request (HARQ) related information, etc.

In addition, the eNB transmits uplink scheduling information about uplink data to a corresponding UE to notify the UE of a time/frequency region that can be used by the UE, coding information, data size, HARQ related information, etc. An interface for user traffic or control traffic transmission may be used between eNBs. A core network (CN) may be composed of the AG and a network node for user registration of the UE. The AG manages UE mobility per TA (tracking area) including a plurality of cells.

While wireless communication technology has been developed to LTE on the basis of wideband code division multiple access (WCDMA), demands and expectations of users and carriers steadily increase. Furthermore, technical evolution in wireless communication technology is required to have competitiveness since other wireless access techniques are being developed. That is, decrease in cost per bit, service availability increase, use of flexible frequency band, simple architecture and open interface, adequate power consumption of UEs, etc. are needed.

Recently, 3GPP has standardized technology subsequent to LTE. This is referred to as "LTE-A" in the specification. A main difference between LTE and LTE-A is a system bandwidth different and introduction of a relay. LTE-A aims to support a wideband of up to 100 MHz. To achieve this, LTE-A employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in LTE. Each frequency block is transmitted using a component carrier.

Figure 2:
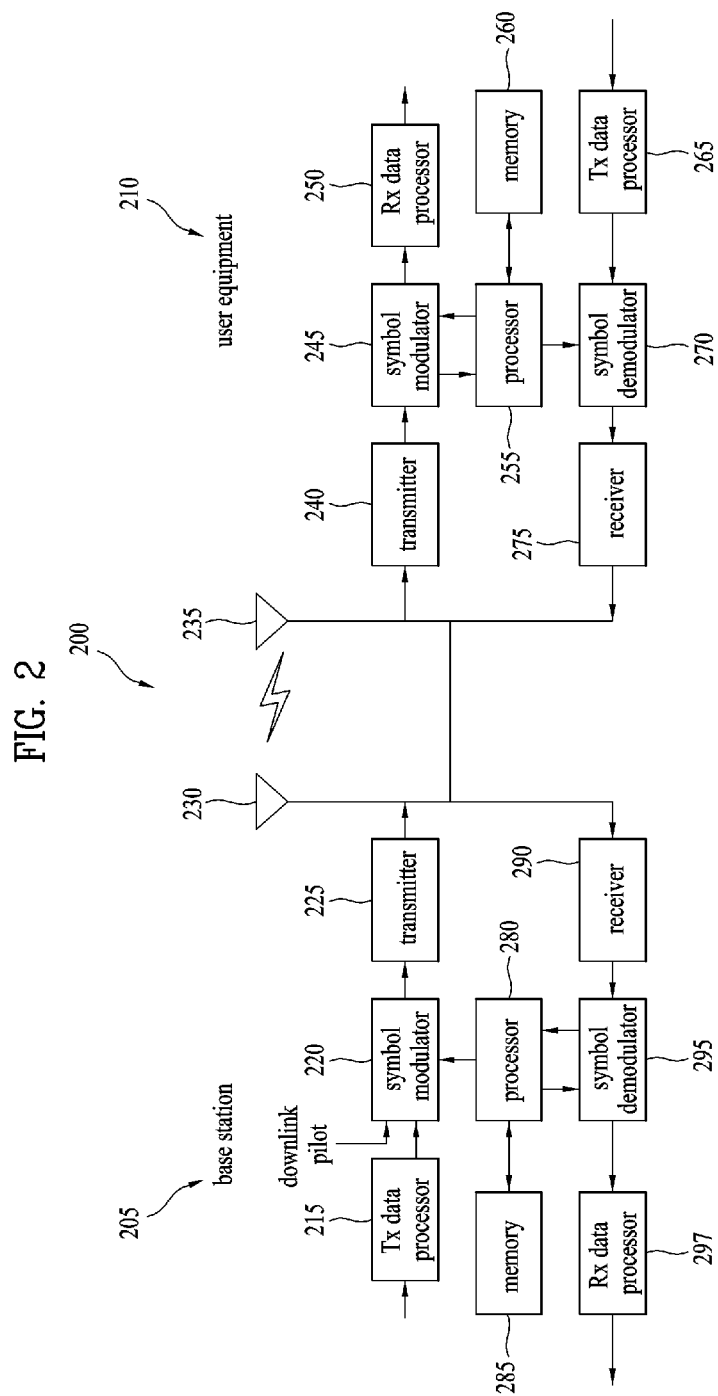
FIG. 2 is a block diagram illustrating configurations of an eNB 105 and a UE 110 in a wireless communication system 100 according to the present invention.

FIG. 2 is a block diagram illustrating configurations of an eNB 205 and a UE 210 in a wireless communication system 200.

While one eNB 205 and one UE 210 are shown in FIG. 2 to simplify the configuration of the wireless communication system 200, the wireless communication system 200 may obviously include one or more eNBs and/or one or more UEs.

Referring to FIG. 2, the eNB 205 may include a transmission (Tx) data processor 215, a symbol modulator 220, a transmitter 225, a Tx/Rx antenna 230, a processor 280, a memory 285, a receiver 290, a symbol demodulator 295, and an Rx data processor 297. The UE 210 may include a Tx data processor 265, a symbol modulator 270, a transmitter 275, a Tx/Rx antenna 235, a processor 255, a memory 260, a receiver 240, a symbol demodulator 245, and an Rx data processor 250. While the antennas 230 and 235 are each shown as a single antenna in the eNB 205 and the UE 210, the eNB 205 and the UE 210 include multiple antennas. Hence, the eNB 205 and the UE 210 support MIMO (Multiple Input Multiple Output). Furthermore, the eNB 205 may support both single user-MIMO (SU-MIMO) and multi-user-MIMO (MU-MIMO) in the present invention.

On the downlink, the Tx data processor 215 receives traffic data, processes the received traffic data through formatting, coding, interleaving, and modulation (or symbol mapping), and thus outputs modulated symbols ("data symbols"). The symbol modulator 220 processes the data symbols received from the Tx data processor 215 and pilot symbols, thus producing a symbol stream.

More specifically, the symbol modulator 220 multiplexes the data symbols and the pilot symbols and transmits the multiplexed symbols to the transmitter 225. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 converts the symbol stream into one or more analog signals and generates a downlink signal suitable for transmission on a radio channel by additionally processing the analog signals (e.g. amplification, filtering, and frequency upconversion). The downlink signal is transmitted to the UE 210 through the antenna 230.

The UE 210 receives the downlink signal from the eNB 205 through the antenna 235 and provides the received downlink signal to the receiver 240. The receiver 240 processes the downlink signal, for example, through filtering, amplification and frequency downconversion and converts the processed downlink signal into digital samples. The symbol demodulator 245 demodulates received pilot symbols and outputs the demodulated pilot symbols to the processor 255 for use in channel estimation.

The symbol demodulator 245 receives a frequency response estimate with respect to downlink from the processor 255, acquires data symbol estimates (i.e. estimates of the transmitted data symbols) by demodulating the received data symbols using the frequency response estimate and provides the data symbol estimates to the Rx data processor 250. The Rx data processor 250 demodulates the data symbol estimates (i.e. performs symbol demapping), deinterleaves the demodulated data symbols, and decodes the deinterleaved data symbols, thereby recovering the traffic data transmitted by the eNB 205.

The operations of the symbol demodulator 245 and the Rx data processor 250 are complementary to the operations of the symbol modulator 220 and the Tx data processor 215 of the eNB 205.

On the uplink, in the UE 210, the Tx data processor 265 outputs data symbols by processing received traffic data. The symbol modulator 270 multiplexes the data symbols received from the Tx data processor 265 with pilot symbols, modulates the multiplexed symbols, and outputs a stream of the symbols to the transmitter 275. The transmitter 275 generates an uplink signal by processing the symbol stream and transmits the uplink signal to the eNB 205 through the antenna 235.

The eNB 205 receives the uplink signal from the UE 210 through the antenna 230. In eNB BS 205, the receiver 290 acquires digital samples by processing the uplink signal. The symbol demodulator 295 provides uplink pilot symbol estimates and uplink data symbol estimates by processing the digital samples. The Rx data processor 297 processes the data symbol estimates, thereby recovering the traffic data transmitted by the UE 210.

The processors 255 and 280 control, adjust and manage operations of the UE 210 and the eNB 205. The processors 255 and 280 may be connected respectively to the memories 260 and 285 that store program code and data. The memories 260 and 285 store an operating system, applications, and general files, in connection with the processors 255 and 280.

The processors 255 and 280 may also be called controllers, microcontrollers, microprocessors, or microcomputers. The processors 255 and 280 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 255 and 280. When the embodiments of the present invention are implemented using firmware or software, the firmware or software may be configured to include a module, a procedure, a function, etc. which performs functions or operations according to the present invention. The firmware or software may be included in the processors 255 and 280, or stored in the memories 260 and 285 and invoked from the memories 260 and 285 by the processors 255 and 280.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/eNB and the network exchange RRC messages through the RRC layer.

The term eNB used in the present invention can refer to a "cell or sector" when used as a regional concept. A serving eNB (or serving cell) can be regarded as an eNB which provides main services to UEs and can transmit and receive control information at a coordinated multiple transmission point. In this sense, the serving eNB (or serving cell) can be referred to as an anchor eNB (or anchor cell). Similarly, a neighbor eNB can be referred to as a neighbor cell.

MIMO System

The MIMO antenna technology is based on the technology that receives a whole message by incorporating data fragments received from a plurality of antennas into one without depending on a signal antenna path. According to the MIMO antenna technology, a data transmission rate may be improved within a specific range, or system coverage may be enhanced with respect to a specific data transmission rate. Under the circumstances, the MIMO technology may widely be used for a user equipment for mobile communication and a relay node, and has received attention as the next generation technology that may overcome limitation of a transmission rate in mobile communication, which causes a limitation situation due to data communication expansion, etc.

Figure 3:
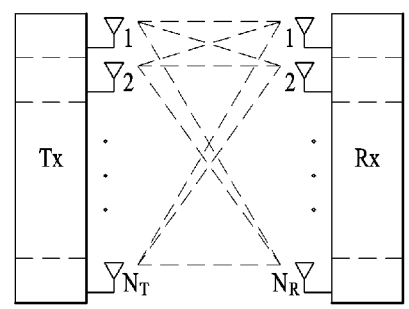
FIG. 3 is a schematic diagram illustrating a general MIMO communication system.
Figure 3:
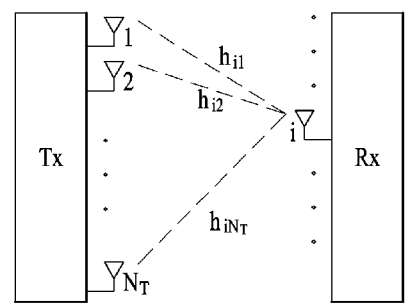

FIG. 3(a) is a schematic diagram illustrating a general MIMO communication system. As shown in FIG. 3(a), if the number of transmitting antennas is increased to $N_T$ and the number of receiving antennas is increased to $N_R$, channel transmission capacity is increased theoretically in proportion to the number of antennas unlike that a plurality of antennas are used in only a transmitter or a receiver. Accordingly, it is possible to improve a transmission rate and remarkably improve frequency efficiency. As channel transmission capacity is increased, a transmission rate may be increased theoretically as much as a value obtained by multiplying a maximum transmission rate $R_0$, which corresponds to a case where a single antenna is used, by an increase rate $R_i$.

$$R_i = \min(N_T, N_R) \quad \text{[Equation 1]}$$

For example, in a MIMO communication system that uses four transmitting antennas and four receiving antennas, a transmission rate theoretically four times greater than that of a single antenna system may be obtained. After theoretical capacity increase of the MIMO system has been proved in the middle of 1990, various technologies have been actively studied to substantially improve a data transmission rate. Also, some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and modeling of a MIMO system, and the study of time space signal processing technology for improvement of transmission reliability and transmission rate.

A communication method in a MIMO system will now be described in more detail with reference to mathematical modeling. As shown in FIG. 3(a), it is assumed that $N_T$ transmitting antennas and $N_R$ receiving antennas exist. First of all, a transmitting signal will be described. If there exist $N_T$ transmitting antennas, the number of maximum transmission information is $N_T$. The transmission information may be expressed as a vector as expressed by the following Equation 2.

$$s = [s_1, s_2, \ldots, s_{N_T}]^T \quad \text{[Equation 2]}$$

Meanwhile, different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as a vector as expressed by the following Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{S}$ may be expressed using a diagonal matrix P of the transmission power as expressed by the following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix W is applied to the information vector $\hat{S}$ of which transmission power is controlled, so as to obtain $N_T$ transmitting signals $x_1, x_2, \ldots, x_{N_T}$. In this case, the weight matrix W serves to properly distribute the transmission information to each antenna depending on the channel status, etc. Such transmitting signals $x_1, x_2, \ldots, x_{N_T}$ may be expressed using a vector X as expressed by the following Equation 5. In this case. In this case, $W_{ij}$ means a weight value between the ith transmitting antenna and the jth information. W may be referred to as a weight matrix or a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

If there exist $N_R$ receiving antennas, receiving signals $y_1, y_2, \ldots, y_{N_R}$ of the respective antennas may be expressed by a vector as expressed by the following Equation 6.

$$y = [y_1, y_2, \ldots, y_{N_R}]^T \quad \text{[Equation 6]}$$

Meanwhile, in case of channel modeling in the MIMO communication system, channels may be classified depending on indexes of transmitting and receiving antenna indexes. In this case, a channel that passes from the jth transmitting antenna to the ith receiving antenna will be expressed as $h_{ij}$. It is noted that index of the receiving antenna is prior to index of the transmitting antenna in index of $h_{ij}$.

Several channels may be grouped into one and then may be expressed by a vector and matrix type. An example of the vector expression will be described as follows. FIG. 3(b) illustrates channels from $N_T$ transmitting antennas to the receiving antenna i.

As shown in FIG. 5(b), the channels from $N_T$ transmitting antennas to the ith receiving antenna may be expressed as follows.

$$h_i^T = [h_{i1}, h_{i2}, \ldots, h_{iN_T}] \quad \text{[Equation 7]}$$

Also, all channels from $N_T$ transmitting antennas to $N_R$ receiving antennas through the matrix expression of the Equation 7 may be expressed by the following Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Since additive white Gaussian noise (AWGN) is actually added to the channels after the above channel matrix H. AWGN $n_1, n_2, \ldots, n_{N_R}$ added to each of the $N_R$ receiving antennas may be expressed by the following Equation 9.

$$n = [n_1, n_2, \ldots, n_{N_R}]^T \quad \text{[Equation 9]}$$

The receiving signals obtained using the above Equations may be expressed by the following Equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

In the meantime, the number of rows and columns of the channel matrix H indicating the channel status is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix. Generally, a rank of the matrix is defined by the smaller number of the number of rows and the number of columns, which are independent from each other. Therefore, the rank of the matrix cannot have a value greater than the number of rows or the number of columns. The rank of the channel matrix H may be expressed by the following Equation 11.

$$\text{rank}(H) \leq \min(N_T, N_R) \quad \text{[Equation 11]}$$

A variety of MIMO transmission/reception (Tx/Rx) schemes, such as a frequency switched transmit diversity (FSTD) scheme, a Space Frequency Block Code (SFBC) scheme, a Space Time Block Code (STBC) scheme, a Cyclic Delay Diversity (CDD) scheme, a time switched transmit diversity (TSTD) scheme, may be used for operation of the MIMO system. In case of Rank 2 or higher, Spatial Multiplexing (SM), Generalized Cyclic Delay Diversity (GCDD), Selective Virtual Antenna Permutation (S-VAP), etc. may be used.

The FSTD scheme is to allocate subcarriers having different frequencies to signals transmitted through multiple antennas so as to obtain diversity gain. The SFBC scheme is to efficiently apply selectivity of a spatial domain and a frequency domain so as to obtain diversity gain and multiuser scheduling gain. The STBC scheme is to apply selectivity of a spatial domain and a time domain. The CDD scheme is to obtain diversity gain using path delay between the respective transmitting antennas. The TSTD scheme is to divide signals transmitted through multiple antennas depending on time. The spatial multiplexing scheme is to transmit different data through the respective antennas so as to increase a transmission rate. The GCDD scheme is to apply selectivity of a time domain and a frequency domain. The S-VAP scheme uses a single precoding matrix and includes a Multi Codeword (MCW) S-VAP for mixing multiple codewords among antennas in spatial diversity or spatial multiplexing and a Single Codeword (SCW) S-VAP using a single codeword.

In case of the STBC scheme among the aforementioned MIMO transmission schemes, the same data symbol is repeated to support orthogonality in a time domain so that time diversity may be obtained. Similarly, the SFBC scheme enables the same data symbol to be repeated to support orthogonality in a frequency domain so that frequency diversity may be obtained. An exemplary time block code used for STBC and an exemplary frequency block code used for SFBC are shown in Equation 12 and Equation 13, respectively. The Equation 12 illustrates a block code in case of 2 transmitting (Tx) antennas, and the Equation 13 illustrates a block code in case of 4 transmitting (Tx) antennas.

$$\frac{1}{\sqrt{2}} \begin{pmatrix} S_1 & S_2 \\ -S_2^* & S_1^* \end{pmatrix} \quad \text{[Equation 12]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 13]}$$

In the Equations 12 and 13, Si (i=1, 2, 3, 4) means a modulated data symbol. In addition, each row of the matrixes of the Equation 12 and 13 may indicate an antenna port, and each column may indicate time (in case of STBC) or frequency (in case of SFBC).

Figure 4:
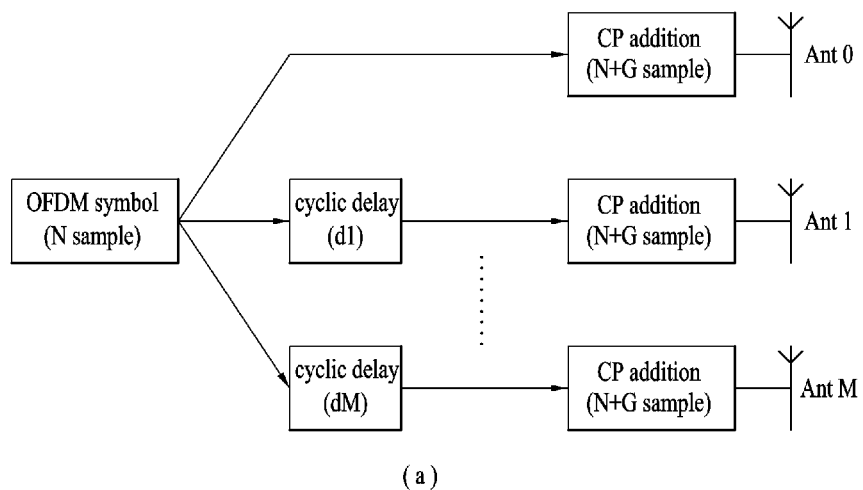
FIG. 4 is a diagram illustrating an example of a general CDD structure in a MIMO system.
Figure 4:
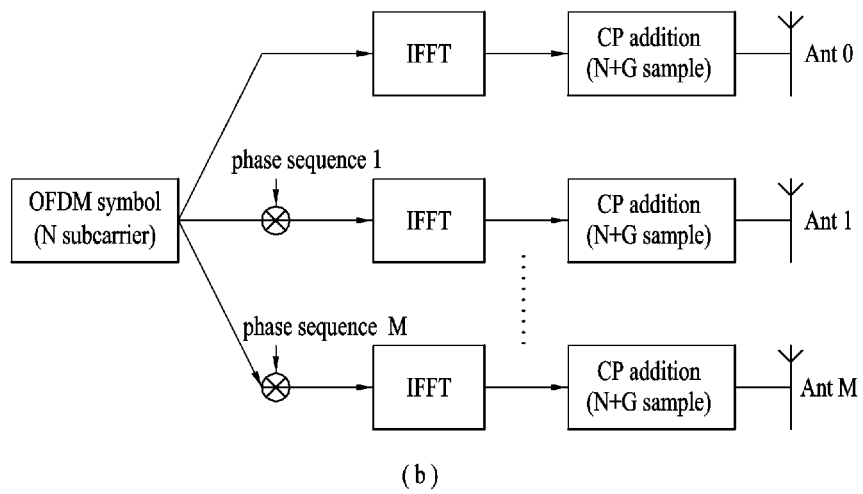

On the other hand, the CDD scheme among the aforementioned MIMO transmission schemes mandatorily increases delay spread so as to increase frequency diversity. FIG. 4 is a diagram illustrating an example of a general CDD structure for use in the MIMO system. FIG. 4(a) illustrates a method for applying cyclic delay in a time domain. If necessary, the CDD scheme based on the cyclic delay of FIG. 4(a) may also be implemented based on phase-shift diversity of FIG. 4(b).

Codebook Based Precoding Scheme

Precoding for properly distributing transmission information in accordance with a channel status of each antenna may be used to support MIMO antenna transmission. A codebook based precoding scheme means that a transmitting side and a receiving side previously defines a set of precoding matrixes, the receiving side (for example, user equipment) feeds the most suitable precoding matrix (that is, precoding matrix index (PMI)) back to the transmitting side (for example, base station) by measuring channel information from the transmitting side, and the transmitting side applies proper precoding to signal transmission on the basis of PMI.

Since the codebook based precoding scheme selects a proper precoding matrix of a set of predetermined precoding matrixes, although optimized precoding is always not used, it is advantageous in that feedback overhead may be reduced as compared with that optimized precoding information is explicitly fed back to actual channel information.

Figure 5:
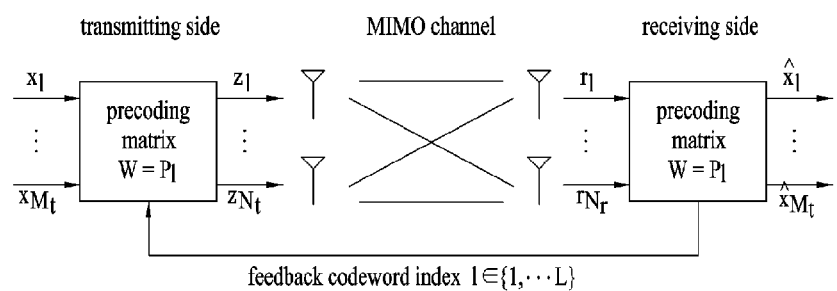
FIG. 5 is a diagram illustrating a basic concept of codebook based precoding.

FIG. 5 is a diagram illustrating a basic concept of codebook based precoding.

According to the codebook based precoding scheme, the transmitting side and the receiving side share codebook information that includes a predetermined number of precoding matrixes which are previously determined in accordance with a transmission rank, the number of antennas, etc. In other words, if feedback information is finite, the precoding based codebook scheme may be used. The receiving side may measure the channel status through a received signal and feed information on infinite number of preferred precoding matrixes (that is, indexes of corresponding precoding matrixes) back to the transmitting side on the basis of the aforementioned codebook information. For example, the receiving side may select an optimized precoding matrix by measuring the received signal in accordance with a maximum likelihood (ML) scheme or a minimum mean square error (MMSE) scheme. Although FIG. 5 illustrates that the receiving side transmits precoding matrix information per codeword to the transmitting side, the present invention is not limited to the example of FIG. 5.

The transmitting side that has received feedback information from the receiving side may select a specific precoding matrix from the codebook on the basis of the received information. The transmitting side that has selected the precoding matrix may perform precoding in such a way to multiply layer signals equivalent to transmission ranks by the selected precoding matrix, and may transmit the precoded signals through a plurality of antennas. The number of rows in the precoding matrix is the same as the number of antennas, and the number of columns is the same as the rank value. Since the rank value is the same as the number of layers, the number of columns is the same as the number of layers. For example, if the number of transmitting antennas is 4 and the number of transmission layers is 2, the precoding matrix may be configured as a 4×2 matrix. Information transmitted through each layer may be mapped into each antenna through the precoding matrix.

The receiving side that has received the signal precoded by and transmitted from the transmitting side may perform inverse processing of precoding performed by the transmitting side and recover the received signals. Generally, since the precoding matrix satisfies a unitary matrix (U) condition such as $U*U^H=I$, the inverse processing of precoding may be performed in such a manner that a Hermit matrix $P^H$ of the precoding matrix P used for precoding of the transmitting side is multiplied by the received signals.

For example, the following Table 1 illustrates a codebook used for downlink transmission that two transmitting antennas are used in the 3GPP LTE release-8/9, and the following Table 2 illustrates a codebook used for downlink transmission that four transmitting antennas are used in the 3GPP LTE release-8/9.

In Table 2, $W_n^{\{s\}}$ is obtained by a set $\{s\}$ configured from Equation expressed as $W_n=I-2u_n u_n^H/u_n^H u_n$. In this case, I represents a 4×4 single matrix, and $u_n$ is a value given by Table 2.

As illustrated in Table 1, a codebook for two transmitting antennas has a total of seven precoding vectors/matrixes. In this case, since the single matrix is intended for the open-loop system, a total of six precoding vectors/matrixes are obtained for precoding of the closed-loop system. Also, a codebook for four transmitting antennas as illustrated in Table 2 has a total of sixty-four (64) precoding vectors/matrixes.

The aforementioned codebook has common characteristics such as constant modulus (CM) characteristics, nested property, constrained alphabet, etc. According to CM characteristics, elements of all precoding matrixes in the codebook do not include '0' and have the same size. According to the nested property, a precoding matrix of a low rank is designed to be composed of a subset of a specific column of a precoding matrix of a high rank. The constrained alphabet characteristic refers to a characteristic that alphabets of elements of all precoding matrices in the codebook are composed of $$\left\{\pm 1, \pm j, \pm \frac{(1+j)}{\sqrt{2}}, \pm \frac{(-1+j)}{\sqrt{2}}\right\}.$$

In Table 2, $W_n^{\{s\}}$ is obtained by a set $\{s\}$ configured from Equation expressed as $W_n=I-2u_n u_n^H/u_n^H u_n$. In this case, I represents a 4×4 single matrix, and $u_n$ is a value given by Table 2.

As illustrated in Table 1, a codebook for two transmitting antennas has a total of seven precoding vectors/matrixes. In this case, since the single matrix is intended for the open-loop system, a total of six precoding vectors/matrixes are obtained for precoding of the closed-loop system. Also, a codebook for four transmitting antennas as illustrated in Table 2 has a total of sixty-four (64) precoding vectors/matrixes.

The aforementioned codebook has common characteristics such as constant modulus (CM) characteristics, nested property, constrained alphabet, etc. According to CM characteristics, elements of all precoding matrixes in the codebook do not include '0' and have the same size. According to the nested property, a precoding matrix of a low rank is designed to be composed of a subset of a specific column of a precoding matrix of a high rank. The constrained alphabet characteristic

TABLE 1

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ -1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ -1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{2}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ | refers to a characteristic that alphabets of elements of all precoding matrices in the codebook are composed of $$\left\{\pm 1, \pm j, \pm \frac{(1+j)}{\sqrt{2}}, \pm \frac{(-1+j)}{\sqrt{2}}\right\}.$$

Feedback Channel Structure

Basically, in FDD (Frequency Division Duplex) systems, since a base station cannot be aware of information on a downlink channel, channel information fed back by a user equipment is used for downlink transmission. In case of the existing 3GPP LTE Release-8/9 system, the user equipment may feed back downlink channel information through a PUCCH or a PUSCH. The user equipment periodically feeds back channel information in the case of the PUCCH and aperiodically feeds back the channel information at the request of the base station in the case of the PUSCH. In addition, channel information on an allocated full frequency band (that is, wideband (WB)) may be fed back or channel information on a specific number of RBs (that is, subband (SB)) may be fed back.

Extended Antenna Configuration

Figure 6:
FIG. 6 is a diagram illustrating examples constituting 8 transmitting antennas.
Figure 6:
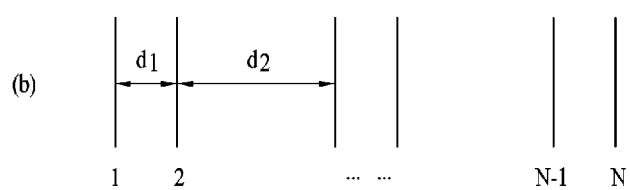
Figure 6:
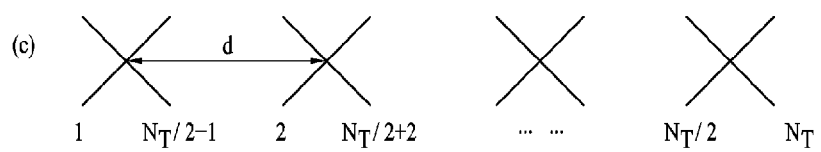

FIG. 6 is a diagram illustrating examples constituting 8 transmitting antennas.

FIG. 4(*a*) illustrates a case in which N antennas configure independent channels without being grouped, which is referred to as a uniform linear array (ULA). In this case, a space for a transmitter and/or a receiver may be insufficient to configure independent channels by spacing out a plurality of antennas.

FIG. 6(*b*) illustrates a paired ULA in which antennas are paired. In this case, a related channel may be configured for paired antennas, and independent channels may be configured for different antenna pairs.

Meanwhile, in the 3GPP LTE Release-10 system may use 8 Tx antennas on downlink, unlike the existing 3GPP LTE Release-8/9 system that uses 4 Tx antennas. To apply this extended antenna configuration, since a plurality of Tx antennas needs to be installed in an insufficient space, ULA antenna configurations as shown in FIGS. 6(*a*) and 6(*b*) may not be suitable. Accordingly, a dual-pole (or cross-pole) antenna configuration as shown in FIG. 6(*c*) may be considered. In this case, antenna correlation may be reduced to enable data transmission with high throughput even if a distance 'd' between antennas is relatively short.

Codebook Structure

As described above, as the transmitting side and the receiving side share a pre-defined codebook, feedback overhead required for the receiving side to feed back precoding information to be used for MIMO transmission from the transmitting side may be reduced, whereby efficient precoding may be performed.

To configure a pre-defined codebook, a precoder matrix may be configured using a DFT (Discrete Fourier Transform) matrix or Walsh matrix. Otherwise, precoders in various forms may be configured according to combination with a phase shift matrix or phase shift diversity matrix.

In the case of co-polarization antenna, DFT based codebooks provide high performance. In configuration of a DFT matrix based codebook, an n×n DFT matrix may be defined as expressed by the following Equation 14.

$$DFTn: D_n(k, \ell) = \frac{1}{\sqrt{n}} \exp(-j2\pi k\ell/n), \quad [\text{Equation 14}]$$

$$k, \ell = 0, 1, \ldots, n-1$$

In case of the DFT matrix of the Equation 14, only one matrix is present for a specific size 'n'. Accordingly, it may be considered to additionally configure and use a rotated version of the DFTn matrix in order to define various precoding matrixes and appropriately use the precoding matrixes according to situation. The following Equation 15 illustrates an exemplary rotated DFTn matrix.

$$\text{rotated } DFTn: D_n^{(G,g)}(k, \ell) = \quad [\text{Equation 15}]$$

$$\frac{1}{\sqrt{n}} \exp(-j2\pi k(\ell + g/G)/n),$$

$$k, \ell = 0, 1, \ldots, n-1, g = 0, 1, \ldots, G.$$

When the DFT matrix is configured as expressed by the Equation 15, G rotated DFTn matrixes may be generated and the generated matrixes satisfy characteristics of the DFT matrix.

Next, a description will be given of a Householder-based codebook structure. The Householder-based codebook structure refers to a codebook configured in a Householder matrix. The Householder matrix is used for Householder transform which is a linear transformation and may be used to perform QR decomposition. QR decomposition refers to decomposition of a matrix into an orthogonal matrix Q and an upper triangular matrix R. The upper triangular matrix refers to a square matrix in which elements below main diagonal entries are all 0. An exemplary 4×4 Householder matrix is expressed by the following Equation 16.

$$M_1 = I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \quad [\text{Equation 16}]$$

$$u_0^T = [1 \quad -1 \quad -1 \quad -1]$$

A 4×4 unitary matrix having CM characteristics may be generated by Householder transform. A codebook may be configured such that an n×n precoding matrix is generated using Householder transform and a column subset of the generated precoding matrix is used as a precoding matrix for transmission at a rank less than 'n' like the codebook for 4 Tx antennas as illustrated in Table 2 above.

Codebook for 8 Tx Antennas

In the 3GPP LTE Release-10 having an extended antenna configuration (e.g. 8 Tx antennas), a feedback scheme used in the existing 3GPP LTE Release-8/9 system may be extended and applied. For example, channel state information (CSI) such as an RI (Rank Indicator), PMI (Precoding Matrix Index), CQI (Channel Quality Information), etc. may be fed back. Hereinafter, a description will be given of a method for designing a dual precoder based feedback codebook which may be used in a system that supports an extended antenna configuration. In the dual precoder based feedback codebook, the receiving side may transmit a PMI to the transmitting side in order to indicate a precoder to be used for MIMO transmission of the transmitting side. A precoding matrix may be indicated by a combination of two different PMIs. That is, the receiving side may feed back two different PMIs (that is, a first PMI and a second PMI) to the transmitting side, and the transmitting side may determine a precoding matrix indicated by a combination of the first and second PMIs and apply the determined precoding matrix to MIMO transmission.

In design of the dual precoder based feedback codebook, 8-Tx antenna MIMO transmission, support for single user-MIMO (SU-MIMO) and multiple user-MIMO (MU-MIMO), suitability of various antenna configurations, codebook design standards, codebook size, etc. may be considered.

A codebook applied to MIMO transmission using 8 Tx antennas may be designed such that the codebook supports only SU-MIMO in case of rank 2 or higher, is optimized for both SU-MIMO and MU-MIMO in case of rank 2 or less and is adapted to various antenna configurations.

For MU-MIMO, it is preferable to separate UEs participating in MU-MIMO in the correlation domain. Accordingly, a codebook for MU-MIMO needs to be designed to correctly operate on a channel having high correlation. Since DFT vectors provide high performance on a channel having high correlation, inclusion of a DFT vector in a set of codebooks of up to rank 2 may be considered. In addition, in a scattering propagation environment (for example, indoor environment having lots of reflected waves) in which many spatial channels may be generated, SU-MIMO may be more suitable as a MIMO transmission scheme. Accordingly, it may be considered that codebooks for ranks higher than rank-2 are designed to have high performance of separating multiple layers.

In design of a precoder for MIMO transmission, it is preferable that one precoder structure has high performance for various antenna configurations (low-correlation, high-correlation and cross-polarization antenna configurations). In arrangement of 8 Tx antennas, a cross-polarization array having an antenna spacing of 4λ may be configured as a low-correlation antenna configuration, a ULA having an antenna spacing of 0.5λ may be configured as a high-correlation antenna configuration, or a cross-polarization array having an antenna spacing of 0.5λ may be configured as a cross-polarization antenna configuration. A DFT based codebook structure may provide satisfactory performance for the high-correlation antenna configuration.

Meanwhile, block diagonal matrixes may be more suitable for the cross-polarization antenna configuration. Accordingly, when a diagonal matrix is introduced to a codebook for 8 Tx antennas, a codebook providing high performance for all antenna configurations may be configured.

Codebook design standards need to satisfy a unitary codebook, CM characteristics, finite alphabet, appropriate codebook size, nested property, etc., as described above. The codebook design standards are applied to 3GPP LTE Release-8/9 codebook design. Application of the codebook design standards to 3GPP LTE Release-10 codebook design supporting extended antenna configurations may be considered.

To sufficiently support advantages of using 8 Tx antennas in relation to codebook size, codebook size needs to increase. A large sized codebook (for example, codebook of 4 bits or more for rank 1 and rank 2) may be needed to obtain a sufficient precoding gain from 8 Tx antennas in a low-correlation environment. A 4-bit codebook may be sufficient to obtain a precoding gain in a high-correlation environment. However, the codebook size for rank 1 and rank 2 may be increased in order to accomplish multiplexing gain of MU-MIMO.

Based on the aforementioned description, for efficient transmission in a wireless communication system, the present invention suggests a method for generating a precoding matrix, which may be operated by reducing the amount of feedback, and a new feedback structure. The present invention is effective when a transmitter uses massive antennas based on an active antenna system (AAS), and may be used for downlink communication between the base station and the user equipment in a cellular network as a representative embodiment.

Figure 7:
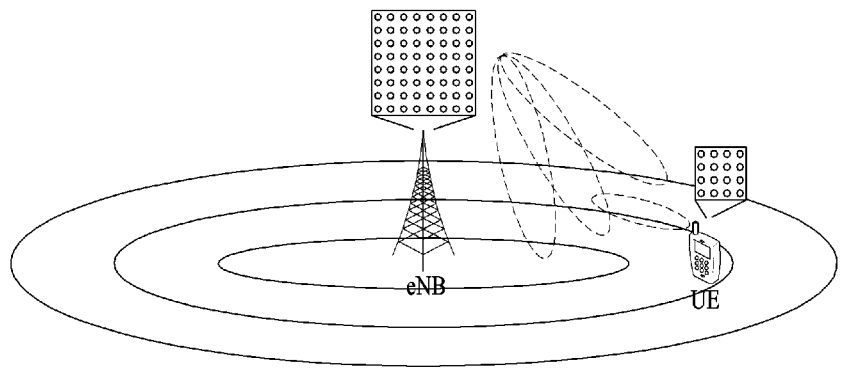
FIG. 7 is a diagram illustrating an active antenna system (AAS)

FIG. 7 is a diagram illustrating an active antenna system (AAS).

Wireless communication systems following LTE Rel-12 consider introduction of an active antenna system (AAS). The AAS refers to a system configured such that each antenna includes an active antenna including an active circuit, unlike a conventional passive antenna system in which an active circuit capable of adjusting the phase and magnitude of a signal is separated from an antenna.

Particularly, the AAS does not require an additional cable, connector, hardware, etc. to connect an active circuit to an antenna since it uses an active antenna, whereby high efficiency may be obtained in view of energy and maintenance costs. Also, since the AAS supports electronic beam control per antenna, the AAS may generate an accurate beam pattern or 3-dimensional beam pattern considering a beam direction and a beam width, thereby achieving an enhanced MIMO scheme.

With the introduction of an enhanced antenna system such as the AAS, large-scale MIMO having multiple input/output antennas and a multi-dimension antenna structure is also considered. For example, unlike the existing linear antenna array, when a 2-dimensional antenna array is employed, a 3-dimensional beam pattern may be formed in accordance with active antennas of the AAS.

Accordingly, if the 3-dimensional beam pattern is used in view of the base station, sector formation in the vertical direction of the beam as well as the horizontal direction of the beam may be considered. Also, in view of the user equipment, when a reception beam is generated using a large-scale receiving antenna, signal power increase according to antenna array gain may be expected. Accordingly, it is advantageous in that throughput requirements of the system may be satisfied with only a transmission power lower than the existing transmission power.

Figure 8:
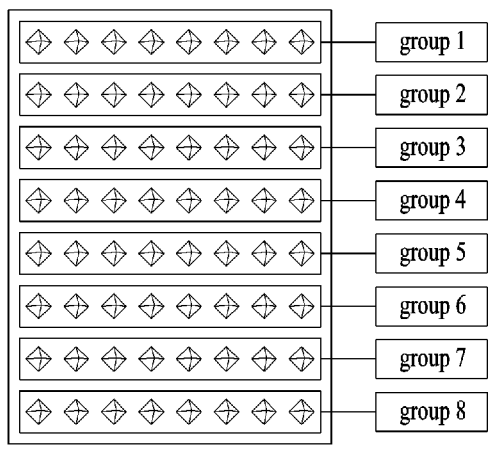
FIG. 8 is a diagram illustrating an example of 2D-AAS to which the present invention may be applied.

FIG. 8 is a diagram illustrating an example of 2D-AAS to which the present invention may be applied. Referring to FIG. 8, in the 2D-AAS, antennas may be installed in a vertical direction and a horizontal direction, whereby massive antenna systems may be formed.

Accordingly, if the 2D-AAS as shown in FIG. 8 is used, the receiving side should feed CSI, which is channel information between the transmitting side and the receiving side, back to the transmitting side so as to effectively use the antennas. However, in the 2D-AAS, it is likely that massive antennas may be used at the transmitting side and the receiving side, whereby channel information to be fed back by the receiving side may be increased in accordance with increase of the number of antennas. For example, if PMI information amount of 4 bits is required for four transmitting antennas, PMI information amount of 64 bits may be required generally when 64 antennas are implemented using the 2D-AAS. However, channel information transmission of such a large amount may not be efficient, and may have complexity that the amount of calculation of PMI, CQI and RI for such CSI cannot be processed by the receiving side within a limited time, or may cause overhead during the processing step.

Accordingly, in order to reduce the feedback amount in the present invention, a method for generating a new precoding matrix and a new feedback structure will be described.

First Embodiment

According to the first embodiment of the present invention, a plurality of antennas owned by the transmitting side are divided into $N_g$ number of groups. For convenience of description, it is assumed that all of the divided groups (that is, $N_g$ number of groups) equally have N number of antennas. However, the present invention may be applied to even a case where a different number of antennas exist for each group. This will be described later. At this time, each antenna group transmits the same data vector $x=[s_1 \, s_2 \ldots s_{N_x}]^T$ to the receiving side. In the vector 'x', the superscript 'T' means transpose. In the data vector, $N_x$ represents the number of layers transmitted from the antenna group.

Moreover, there is no limitation in a grouping method for transmitting antennas in the present invention. For example, as shown in FIG. 8, although horizontal antennas may be grouped into each group, vertical antennas may be grouped into each group. That is, various grouping methods may be applied depending on requirements of the individual wireless system. This grouping method may mutually be scheduled between the transmitting side and the receiving side, or the transmitting side may notify the receiving side of information on the grouping method through upper layer signaling (for example, RRC signaling) as the case may be.

In addition, the receiving side may recommend the transmitting side information on the grouping method as the case may be. For example, it may be assumed that $N_{GR}$ number of cases related to grouping are mutually scheduled between the transmitting side and the receiving side. In this case, after index is given to each grouping method, the receiving side may feed grouping index back to the transmitting side in accordance with channel information or correlation information of the channel. For example, as shown in FIG. 8, if grouping index for a case where horizontal antennas are grouped into each group is '1' and grouping index for a case where vertical antennas are grouped into each group is '2', the receiving side may notify the transmitting side of the grouping index (that is, '1' or '2') through 1-bit feedback in accordance with the channel correlation. The transmitting side may perform grouping on the basis of the information on the grouping index transmitted from the receiving side, use grouping used before as it is by disregarding the information transmitted from the receiving side, or determine a proper grouping index with reference to the information transmitted from the receiving side and signal the determined result to the receiving side.

In the present invention, precoding (that is, open-loop scheme) is performed within each antenna group without channel information, and precoding (that is, closed-loop scheme) is performed using channel information between the antenna groups. Hereinafter, for precoding having no channel information within the antenna group, cyclic delay diversity (CDD) will be described for convenience of description. However, the present invention may be applied even to a case where another type precoding having no channel information is performed. For example, precoding based on transmit diversity or channel reciprocity or fixed precoding regardless of time and frequency may be used as precoding within the antenna group to which the present invention may be applied.

Hereinafter, a method for using CDD precoding within the antenna group according to the first embodiment of the present invention will be described. First of all, CDD precoding within each ith antenna group is expressed as $P_i$, and has a size of $N \times N_x$. Each $P_i$ exists to obtain diversity of the channel between each antenna within the ith antenna group and the receiving side.

For example, CDD precoding used within the antenna group will be described. In the LTE system, large delay CDD precoding is used as expressed by the following Equation 17.

$$P_i(k)=W(k) \times D(k) \times U \qquad \text{[Equation 17]}$$

In the Equation 17, $P_i(k)$ means precoding of the ith antenna group for the kth data vector x(k). In the Equation 17, a D(k) matrix of $N_x \times N_x$ which is a diagonal matrix and a U matrix may be used by being selected from Table 3.

TABLE 3

| Number of layers $N_x$ | U | D |
|---|---|---|
| 2 | $\frac{1}{\sqrt{2}}\begin{bmatrix} 1 & 1 \\ j & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

W(k) matrix is a precoding matrix (or weight matrix), and may be selected in accordance with the number of antennas. For example, if the number of antennas is 2, a codebook index '0' is used for the W(k) matrix in the above Table 1. Alternatively, if the number of antennas is 4, W(k)=$C_m$ may be used. At this time, m is defined by $$m = \left(\left\lfloor \frac{k}{N_x} \right\rfloor \bmod 4\right) + 1 \in \{1, 2, 3, 4\},$$

and $c_1$, $c_2$, $c_3$ and $c_4$ may be determined by the codebook index {12, 13, 14, 15} in the above Table 2.

Also, in the present invention, $P_i(k)$ for CDD may be categorized into two schemes. One of the two schemes is that precoding $P_i(k)$ is designed differently per i group (first scheme). The other one is that several groups use CDD precoding of the same pattern (second scheme).

For example, in case of the former case (the first scheme in which precoding is different per group), a condition of $P_1(k) \neq P_2(k) \neq \ldots \neq P_{N_g}(k)$ is given for same 'k', and in case of the latter case (the second scheme in which precoding of the same pattern is used for at least one group), a condition of $P_{g1}(k) = P_{g2}(k) = \ldots = P_{gN_c}(k)$ is given for the 'k'. In this case, $g_k$ represents index of antenna groups that use CDD precoding of the same pattern. Also, in the latter case (that is, the second scheme), a plurality of groups that use the same precoding pattern may exist. Moreover, these two CDD schemes may mutually be selected and used per system or grouping. That is, in case of the system having the high channel correlation between the antenna groups, CDD may be used with a condition of $P_1(k) \neq P_2(k) \neq \ldots \neq P_{N_g}(k)$ for channel diversity between the groups. In case of the system having the low channel correlation between the antenna groups, on the assumption that channel diversity is already configured between the groups, CDD may be used with a condition of $P_{g1}(k) = P_{g2}(k) = \ldots = P_{gN_c}(k)$.

Moreover, in the present invention, if CDD precoding is applied to antennas within a specific antenna group, two variable precoding levels may be applied. The first case is that CDD precoding is varied per resource element (RE). The second case is that CDD precoding is varied per resource block (RB). The CDD scheme according to the aforementioned embodiment of the present invention corresponds to the case where CDD precoding is varied per resource element. In the second case (CDD precoding is varied per RB), CDD precoding $P_i$ (RB) used for the same resource block has the same precoding value for the data vector $x(k)$ corresponding to the corresponding RB.

In the present invention, precoding is performed between the antenna groups by using CSI based on feedback. That is, group precoding is performed between the respective antenna groups by using $a_i = \exp(i\theta_i)$. In this case, $a_i$ is a parameter for simultaneously controlling phases of $N_x$ number of data groups within each antenna group as much as $\theta_i$. A transmitting signal y based on intra-group precoding and inter-group precoding is as expressed by the following Equation 18.

$$y = \begin{bmatrix} P_1 \times a_1 \times x \\ P_2 \times a_2 \times x \\ \vdots \\ P_{N_g} \times a_{N_g} \times x \end{bmatrix} \text{ for } CDD \text{ precoding} \quad [\text{Equation 18}]$$

In the Equation 18, it is noted that phases of symbols within the data vector x transmitted from each antenna group are varied as much as $\theta_i$. Group precoding $a_i$ is generated using codeword $\theta = [\theta_1 \theta_2 \ldots \theta_{N_T}]$. The codeword $\theta$ is selected from a codebook $\phi$ that includes a set of vectors composed of phases ($\theta \in \phi$). Of course, when a relative angle is only required, $\theta_1 = 0$ may be fixed.

Accordingly, if the transmitting signal y is combined with the channel, it may be expressed by the following Equation 19.

$$Z = \begin{bmatrix} H_1 & H_2 & \ldots & H_{N_g} \end{bmatrix} \times \begin{bmatrix} P_1 \times a_1 \times x \\ P_2 \times a_2 \times x \\ \vdots \\ P_{N_g} \times a_{N_g} \times x \end{bmatrix} \quad [\text{Equation 19}]$$

That is, if the number of antennas at the receiving side is $N_r$, the channel between the transmitting side and the receiving side in the Equation 19 may be expressed as $H = [H_1 H_2 \ldots H_{Ng}]$. In the channel matrix, $H_i$ represents the channel between the ith antenna group and the receiving side, and its size is expressed as $N_r \times N$. In the Equation 19, $P_i$ varies the channel $H_i$ which is the channel between each antenna group and the receiving side through CDD, and $a_i$ serves to control the channels between the groups to be added in the same direction if possible. Also, in the Equation 19, it is noted that $a_i$ matrix does not vary the channel within the group.

Accordingly, for the embodiment of the present invention, the transmitting side may transmit a reference signal (RS) to the receiving side. For example, in the LTE system, CSI-RS may be used. The receiving side may measure the channel on the basis of the reference signal (RS) received from the transmitting side, select a codeword $\theta$, which maximizes sum-rate or SINR (average value based on frequency or time axis as the case may be), from the codebook $\phi$ by applying a precoding scheme within the (antenna) group which is previously identified, calculate RI (Rank Indicator), and then feed the corresponding codeword index and rank index (RI) back to the transmitting side. That is, the codeword index may be operated similarly to the PMI of the LTE system.

Afterwards, when the transmitting side transmits data to the receiving side, the transmitting side may transmit a signal, to which both intra-group precoding and inter-group precoding are applied, to the receiving side together with a reference signal to which such precoding is applied. That is, the same operation as that of the DM-RS used in the LTE system may be performed. At this time, the receiving side recognizes that the reference signal uses $N_x$ number of antenna ports only.

According to the aforementioned embodiment of the present invention, the reference signal that serves as the CSI-RS may be transmitted by being reflected by intra-group precoding. For example, if precoding within the antenna group is based on fixed precoding regardless of time and frequency axes, the CSI-RS to which the fixed precoding is applied may be transmitted. In this case, CSI-RS ports to be transmitted may be reduced to the number of layers, whereby it is advantageous in that overhead caused by transmission of the reference signal may be reduced.

Also, in the present invention, since $\theta$ index having an inter-group phase value is only fed back, it is advantageous in that the system having massive antennas may be operated with the amount of efficient feedback.

Second Embodiment

In the aforementioned first embodiment of the present invention, it is assumed that the number of antennas is equally provided within each group and the number of layers is equally transmitted within each group. However, in the second embodiment of the present invention, extended application of the aforementioned present invention will be described. In other words, first of all, the number of antennas within each group may be varied per group. Second, the number of data layers transmitted within each group may be varied per group. Third, inter-group precoding $a_i$ may be varied per transmitting symbol within each group. Hereinafter, the same description of the second embodiment as that of the first embodiment may be replaced with the aforementioned description.

For convenience of description, it is assumed that the ith group of $N_g$ number of groups owned by the transmitting side has $N_i$ number of antennas. At this time, each antenna group transmits a data vector of $X_j=[X_{1j} X_{2i} \ldots X_{N_{xi}j}]^T$. It is assumed that $N_{xi}$ in the data vector is the number of layers transmitted from each antenna group. It is also assumed that symbols within each antenna group are basically repeated with symbols within another antenna group. For example, it may be assumed that the transmitting side having $\Sigma_i^{N_g} N_i = 10$ number of antennas divides three antenna groups into groups each having antennas of $N_1=4$, $N_2=3$, and $N_3=3$. At this time, $x_1$, $x_2$ and $x_3$ may be transmitted such that data symbols are repeatedly transmitted as follows: $x_1=[s_1\ s_2\ s_2\ s_4]^T$, $x_2=[s_1\ s_2\ s_3]^T$, $x_3=[s_1\ s_2\ s_3]^T$. Although the symbols are repeatedly transmitted as much as the number of layers within each antenna group as described above, it is not to be understood that a different scheme of data repetition is excluded from the present invention.

Precoding based on the aforementioned CDD (cyclic delay diversity) is applied within the antenna group. At this time, precoding may be expressed as $P=\mathrm{diag}[P_1\ P_2 \ldots P_{N_g}]$. At this time, $P_i$ is CDD precoding for obtaining diversity of the channel within the ith group, and has a size of $N_i \times N_{xi}$. Since CDD precoding may be performed in the same manner as the aforementioned first embodiment of the present invention, its detailed description will be replaced with the aforementioned description. Also, it is to be understood that there should be no limitation in the aforementioned precoding scheme having no channel information that may be applied to the second embodiment of the present invention. For example, precoding based on transmit diversity or channel reciprocity or fixed precoding regardless of time and frequency may be used as precoding within the antenna group to which the present invention may be applied.

Hereinafter, a method for using CDD precoding within the antenna group according to the second embodiment of the present invention will be described. In the second embodiment of the present invention, precoding is performed between the antenna groups by using CSI based on feedback. Precoding between the respective groups may be expressed by $a=\mathrm{diag}[\omega_1\ \omega_2\ \ldots\ \omega_{N_g}]$. In this Equation, $\omega_i=\mathrm{diag}[a_{i1}\ a_{i2}\ \ldots\ a_{iN_{xi}}]$ is a diagonal matrix for controlling a phase for data within the group. In the Equation, $a_{ik}=\exp(j\theta_{ik})$ controls a phase of the kth data symbol transmitted from the ith antenna group. Accordingly, the transmitting signal 'y' based on the precoding according to the second embodiment of the present invention may be expressed by the following Equation 20.

$$y = \mathrm{diag}[\ P_1\ \ P_2\ \ \ldots\ \ P_{N_g}\ ] \times \mathrm{diag}[\ \omega_1\ \ \omega_2\ \ \ldots\ \ \omega_{N_g}\ ] \times [\ x_1\ \ x_2\ \ \ldots\ \ x_{N_g}\ ]^T$$

[Equation 20]

In the Equation 20, symbols within each data vector $x_i$ represent that phases are respectively varied by $\omega_i$. $\omega_i$ of group precoding $a=\mathrm{diag}[\omega_1\ \omega_2\ \ldots\ \omega_{N_g}]$ is generated using a codeword $\theta_i=[\theta_1\ \theta_2\ \ldots\ \theta_{N_{xi}}]$. The codeword $\theta_i$ is selected from a codebook $\phi_i$ that includes a set of vectors composed of phases ($\theta_1 \in \phi_1$). Of course, when a relative angle is only required, $\theta_1=0$ may be fixed.

Accordingly, if the transmitting signal 'y' is combined with the channel, it may be expressed by the following Equation 21.

$$Z=[H_1 H_2 \ldots H_{N_g}] \times \mathrm{diag}[P_1 P_2 \ldots P_{N_g}] \times \mathrm{diag}[a_1 I_{N_1} a_2 I_{N_2} \ldots a_{N_g} I_{N_{N_g}}] \times [x_1 x_2 \ldots x_{N_g}]^T$$

[Equation 21]

Accordingly, for the embodiment of the present invention, the transmitting side may transmit a reference signal (RS) to the receiving side. For example, in the LTE system, CSI-RS may be used. The receiving side may measure the channel on the basis of the reference signal (RS) received from the transmitting side, select a codeword $\theta$, which maximizes sum-rate or SINR (average value based on frequency or time axis as the case may be), from the codebook $\phi$ by applying a precoding scheme within the (antenna) group which is previously identified, and then feed the corresponding codeword index back to the transmitting side.

At this time, the receiving side may select the number of layers within each antenna group and feed the selected layers back to the transmitting side. If it is assumed that the selected number of layers is fed back as rank index (RI), the receiving side should transmit each RI for each group. That is, if complexity of the receiving side is too high due to feedback amount for RI or RI transmission, a behavior of the user equipment (UE behavior) may be configured such that RI assumed as the same value in all the groups may be transmitted. Moreover, the transmitting side may indicate whether to assume common rank index (RI) between the groups through semi-static indication (for example, RRC signaling).

Afterwards, when the transmitting side transmits data to the receiving side, the transmitting side may transmit a signal, to which both intra-group precoding and inter-group precoding are applied, to the receiving side together with a reference signal to which such precoding is applied. That is, the same operation as that of the DM-RS used in the LTE system may be performed. At this time, the receiving side recognizes that the reference signal uses $N_x$ number of antenna ports only. Also, the reference signal that serves as the CSI-RS may be transmitted by being reflected by intra-group precoding.

Although the aforementioned embodiments of the present invention have been described based on the case where all the transmitting antennas are used, it may be favorable that a specific number of antenna groups (selected from all antenna groups) are selected and used as the case may be. This is because that better precoding may be used when a small number of antenna groups are used due to a granularity problem of the codebook $\phi$ (or $\phi_i$). Also, this is because that better gain may be obtained by alignment of some groups not all the groups if phases of data within each antenna group are controlled at one angle.

Accordingly, a group selection scheme may be applied to the present invention. The group selection scheme means that some of all the groups divided for all the antennas are only selected and used. For the group selection scheme, an antenna grouping vector 'A' may be defined as follows.

$$A=[a_1 a_2 \ldots a_{N_g}]$$

[Equation 22]

In the Equation 22, the vector 'A' means whether all the groups (that is, $N_g$ number of antenna groups) divided for all the antennas are used. An element $a_i$ in the vector 'A' represents whether the ith antenna group is used, and has a value of '0' or '1'. For example, the value of '0' may represent that the ith antenna group is not used while the value of '1' may represent that the ith antenna group is used. The vector 'A' may be selected from all the sets available by the vector, or may be selected from a subset of each set. For example, when the vector 'A' is selected from a subset that uses two groups only, the vector 'A' may be used in such a manner that one of two vectors A having a value of 1 is selected. Such a set of the vectors 'A' may be notified from the transmitting side to the receiving side through upper layer signaling (for example, RRC signaling). Alternatively, the receiving side may feed preferred information on the set of the vectors 'A' back to the transmitting side.

Moreover, in the group selection scheme, the receiving side may select all suitable indexes θ from the set of the vectors 'A' or all the vectors 'A' within the subset on the basis of the measured channel. Afterwards, the receiving side may feed the most favorable vector 'A' and the most favorable value of θ back to the transmitting side by calculating the selected indexes through a metric (for example, sum-rate or SINR) considered by the receiving side.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

A specific operation which has been described herein as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The 'base station' (BS) may be replaced with terminologies such as a fixed station, Node B, eNode B (eNB), and an access point (AP).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned efficient feedback transmission method in multi-antenna wireless communication system and the device for the same have been described based on the 3GPP LTE system, the method and the device may be applied to various wireless communication systems in addition to the 3GPP LTE system.

The invention claimed is:

1. A method for feeding back channel state information with respect to a downlink transmission by a user equipment in a wireless communication system supporting multiple antennas, the method comprising:

transmitting a grouping index indicating whether antennas are vertically grouped or horizontally grouped, wherein the grouping index is determined based on channel correlation;

performing a channel measurement for the downlink transmission; and transmitting a precoding matrix indicator (PMI) indicating precoding matrixes for multiple antennas, based on a result of the channel measurement, wherein the multiple antennas are grouped as N number of antenna groups corresponding to the grouping index, where N>0 and N is an integer, wherein the precoding matrixes for the multiple antennas are determined by N number of precoding matrixes for the antenna groups and phase coefficient matrixes corresponding to the N number of precoding matrixes for the antenna groups, and wherein the precoding matrixes for multiple antennas are configured to be applied by cyclic delay diversity (CDD) precoding according to the channel correlation.

2. The method according to claim 1, wherein the precoding matrixes for the antenna groups are determined by a precoding matrix based on a number of antennas and a diagonal matrix based a number of layers.

3. The method according to claim 1, wherein each of the phase coefficient matrixes has a phase coefficient determined using channel state information (CSI).

4. The method according to claim 1, wherein each of the phase coefficient matrixes has a phase coefficient corresponding to a specific index, which is set to 0.

5. The method according to claim 1, further comprising:
identifying grouping information for determining antenna groups for the multiple antennas.

6. The method according to claim 1, further comprising:
receiving indication information for selecting M number of antennas from the N number of antenna groups, where N≥M>0, and N and M are integers.

7. A user equipment for feeding back channel state information with respect to a downlink transmission in a wireless communication system supporting multiple antennas, the user equipment comprising:

a radio frequency (RF) unit; and
a processor,
wherein the processor is configured to:
- transmit a grouping index indicating whether antennas are vertically grouped or horizontally grouped, wherein the grouping index is determined based on channel correlation,
- perform a channel measurement for the downlink transmission, and
- transmit a precoding matrix indicator (PMI) indicating precoding matrixes for multiple antennas, based on a result of the channel measurement, wherein the multiple antennas are grouped as N number of antenna groups corresponding to the grouping index, where N>0 and N is an integer, wherein the precoding matrixes for the multiple antennas are determined by N number of preceding matrixes for the antenna groups and phase coefficient matrixes corresponding to the N number of preceding matrixes for the antenna groups, and wherein the precoding matrixes for the multiple antennas are configured to be applied by cyclic delay diversity (CDD) precoding according to the channel correlation.

* * * * *